(12) United States Patent
Yang

(10) Patent No.: US 8,201,786 B2
(45) Date of Patent: Jun. 19, 2012

(54) ELECTRONIC DEVICE WITH SUPPORT MECHANISM

(75) Inventor: Li-Jun Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 187 days.

(21) Appl. No.: 12/752,128

(22) Filed: Apr. 1, 2010

(65) Prior Publication Data

US 2011/0031853 A1 Feb. 10, 2011

(30) Foreign Application Priority Data

Aug. 4, 2009 (CN) .......................... 2009 1 0305142

(51) Int. Cl.
*F16M 11/24* (2006.01)
*A47B 91/00* (2006.01)
(52) U.S. Cl. .................. 248/188.2; 248/188.8; 248/649; 248/673
(58) Field of Classification Search .................. 248/157, 248/161, 188, 188.2, 188.4, 188.5, 188.7, 248/188.8, 676, 677, 673, 649, 650; 361/679.11, 361/679.02, 679–683; 353/70, 115, 119; 254/97, 103, 421, 422, 425, 427
See application file for complete search history.

(56) References Cited

U.S. PATENT DOCUMENTS

| 4,991,805 | A | * | 2/1991 | Solak et al. | 248/188.4 |
| 5,890,696 | A | * | 4/1999 | Ozawa | 248/677 |
| 5,967,472 | A | * | 10/1999 | Wilhelmstatter et al. | 248/188.4 |
| 6,302,543 | B1 | * | 10/2001 | Arai et al. | 353/70 |
| 6,762,931 | B2 | * | 7/2004 | Chen | 361/679.11 |
| 6,910,665 | B2 | * | 6/2005 | Avendano et al. | 248/188.2 |
| 7,111,948 | B2 | * | 9/2006 | Lee et al. | 353/119 |
| 7,258,313 | B2 | * | 8/2007 | Gabriel | 248/188.2 |
| 2002/0139909 | A1 | * | 10/2002 | Oyama et al. | 248/188.8 |

* cited by examiner

*Primary Examiner* — Tan Le
(74) *Attorney, Agent, or Firm* — Altis Law Group, Inc.

(57) ABSTRACT

An electronic device includes a main body including a housing. The housing includes a side plate and a bottom plate connected to the side plate. An opening is defined in the side plate. A perforation is defined in the bottom plate. The opening is in alignment with the perforation. A support mechanism is mounted on the inside of the housing and includes a guide pole fixed to the bottom plate, a first threaded pole screwed onto the guide pole, and penetrating the perforation, a second threaded pole screwed onto the guide pole; and an adjusting wheel fixed to the second threaded pole, and located on the opening of the side plate. A portion of the adjusting wheel is exposed from the housing. A support base is fixed to the portion of the first threaded pole exposed from the housing.

6 Claims, 6 Drawing Sheets

ELECTRONIC DEVICE WITH SUPPORT MECHANISM

BACKGROUND

1. Technical Field

The present disclosure relates to electronic devices and, particularly, to an electronic device with a support mechanism.

2. Description of Related Art

For some electronic devices, such as, portable notebook, keyboard, projector, and so on, because of some issues such as, heat dissipation, angle of view, comfort level et al., it is necessary to provide a support mechanism to the electronic devices to adjust the height of the electronic devices located on a support surface, thereby effectively resolving the above issues. However, it is inconvenient to take the support mechanism with users when travelling. Furthermore, the height of the support mechanism is generally fixed, it is often not easy to adjust the electronic devices to a desirous height.

Therefore, what is needed is an electronic device with a support mechanism to overcome the described shortcoming.

DETAILED DESCRIPTION

Figure 1:
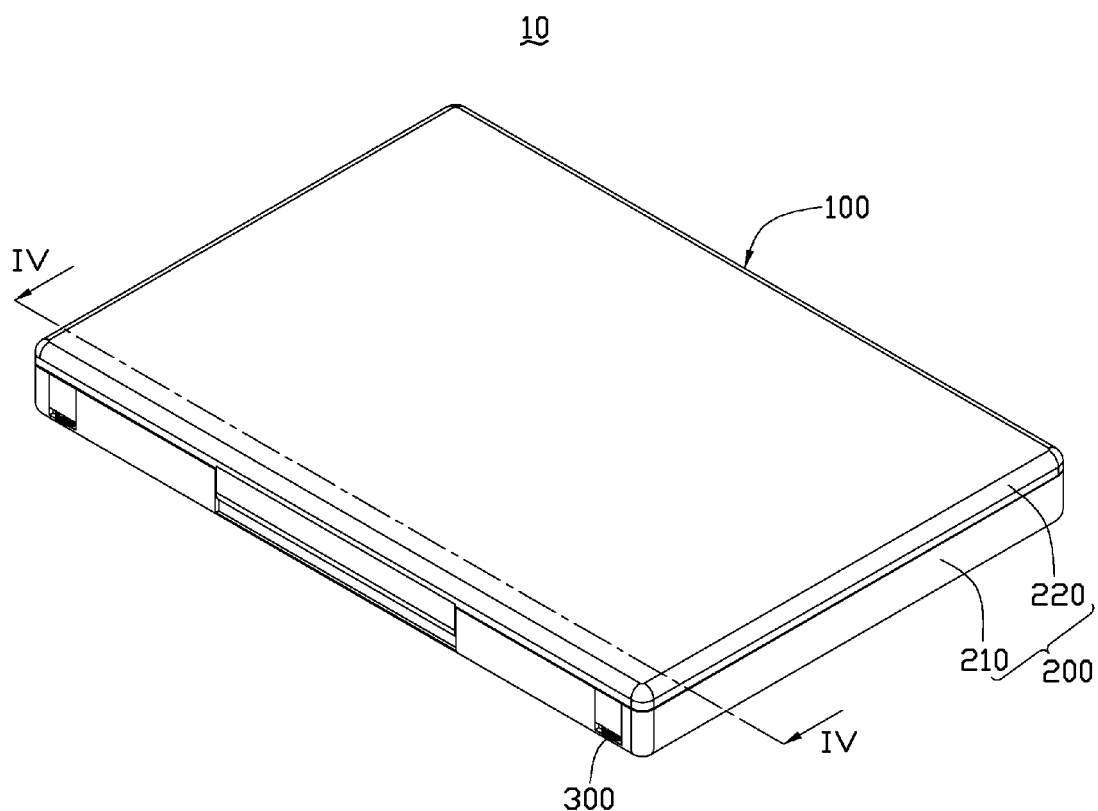
FIG. 1 is an isometric view of one embodiment of an electronic device.

Referring to FIG. 1, an embodiment of an electronic device 10 is illustrated. The electronic device 10 includes a main body 100 and two support mechanisms 300 mounted on the bottom of the main body 100. Each support mechanism 300 is configured for adjusting a height of the main body 100 located on a support surface (not shown). In the exemplary embodiment, the electronic device 10 may be a portable notebook.

The main body 100 includes a housing 200 and contains a plurality of components, such as, circuit boards, received inside of the housing 200. Each support mechanism 300 is fixed to the housing 200. The housing 200 includes a lower shell 210 and an upper shell 220 engaged with the lower shell 210.

Figure 2:
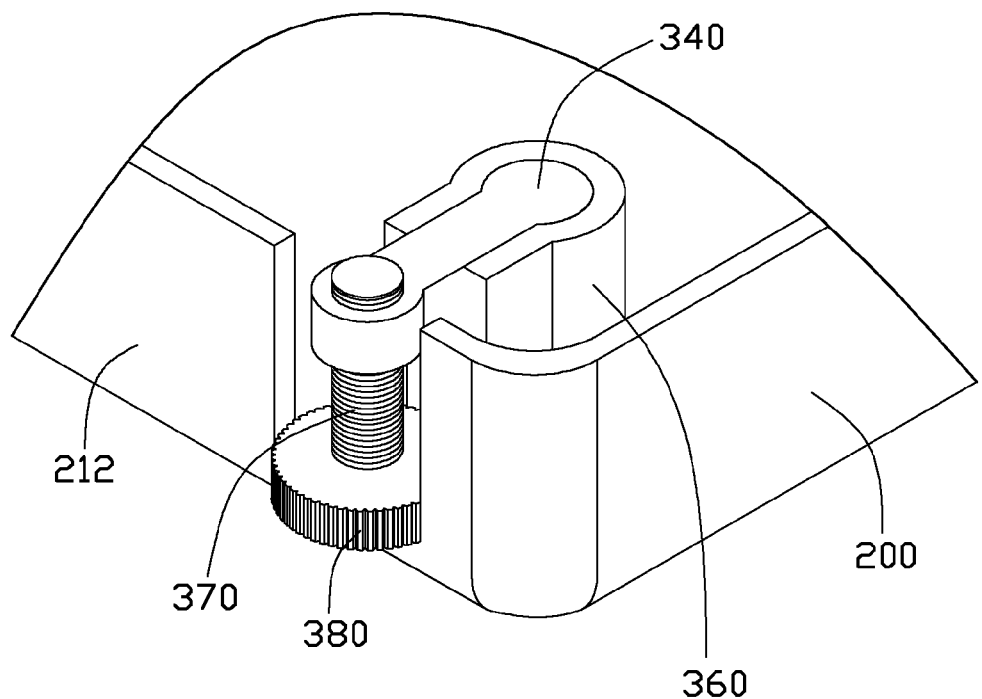
FIG. 2 is a partial, isometric view of one embodiment of a lower shell and a support mechanism of the electronic device of FIG. 1.
Figure 3:
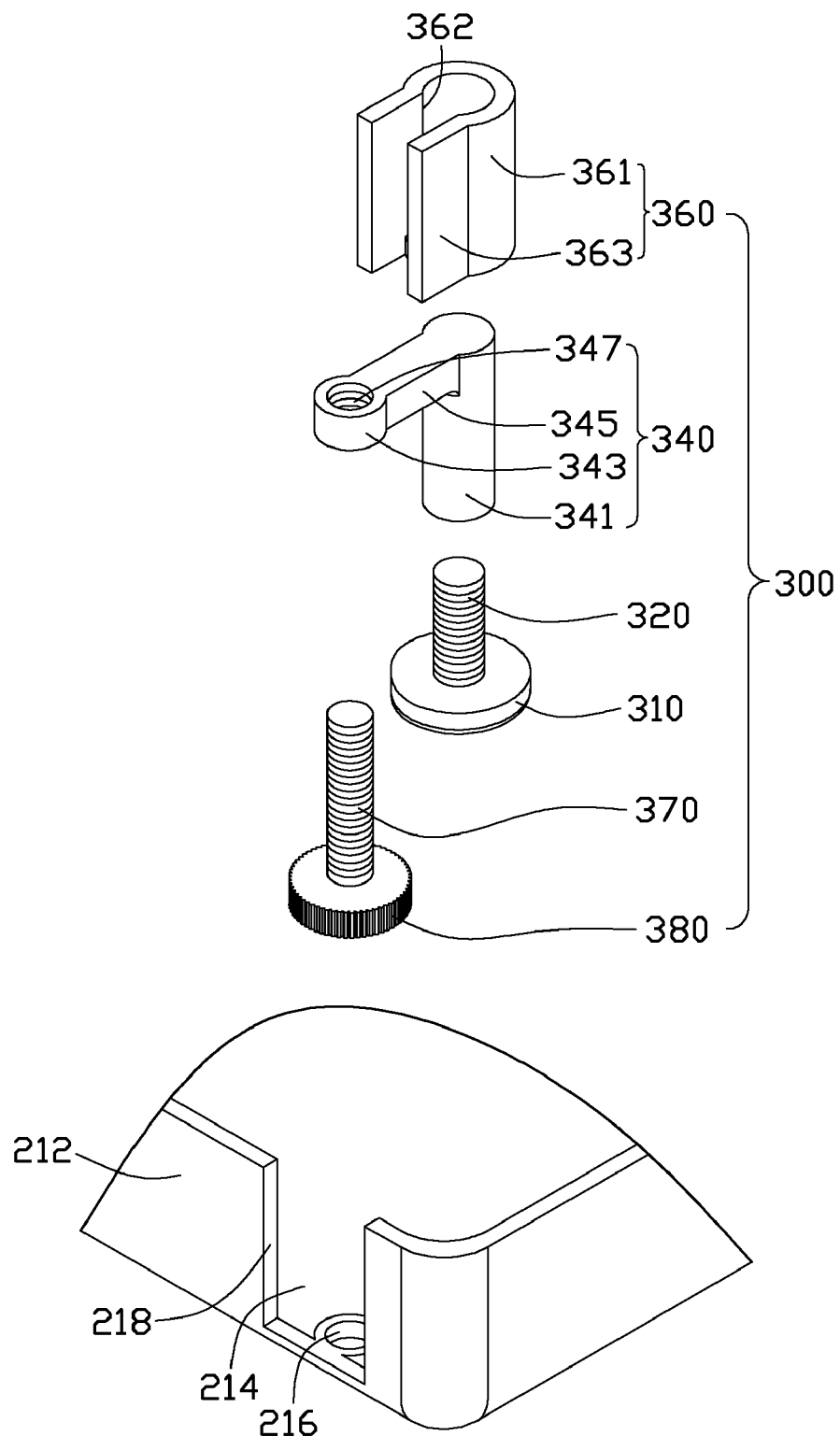
FIG. 3 is an exploded view of the support mechanism of FIG. 2.

Referring to FIGS. 2-3, the lower shell 210 includes a side plate 212 and a bottom plate 214 connecting to the side plate 212. An opening 218 and a perforation 216 are defined around a corner of the lower shell 210, and are configured for setting the support mechanism 300. The opening 218 is defined in the side plate 212, the perforation 216 is defined in the bottom plate 214 of the lower shell 210. The perforation 216 is in alignment with the opening 218.

The support mechanism 300 includes a support base 310, a first threaded pole 320, a guide pole 340, a guide sleeve 360, a second threaded pole 370, and an adjusting wheel 380.

The support base 310 is fixed to one end of the first threaded pole 320. The support base 310 is disk-shaped, and is configured for contacting the support surface, such as a desktop, to support the main body 100 on the support surface.

Figure 4:
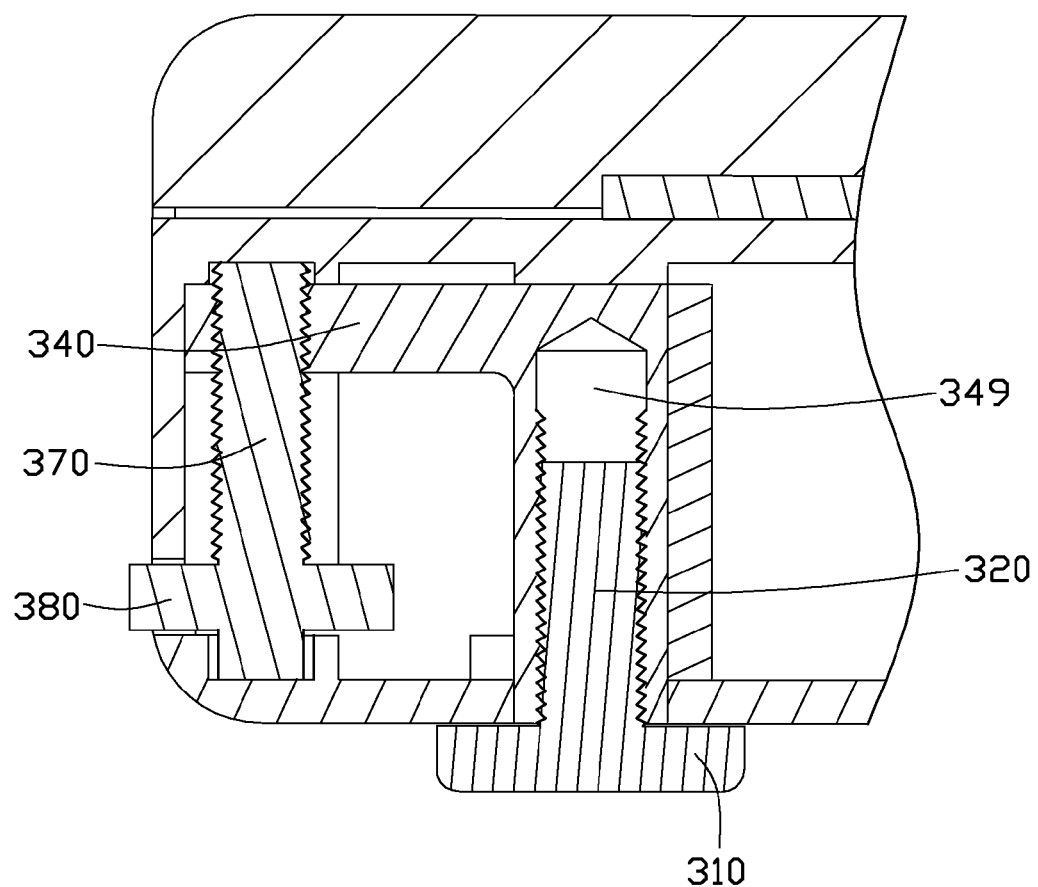
FIG. 4 is a partial, cross-sectional view of the support mechanism of FIG. 2 of the electronic device of FIG. 1 in an initial state, taken along the line IV-IV in FIG. 1.

The guide pole 340 is L shaped. The guide pole 340 includes a first pole body 341, a second pole body 343 approximately parallel to the first pole body 341, and a connection arm 345 connecting to the first pole body 341 and the second pole body 343. The first pole body 341 is a hollow cylinder with an opening set in one end of the hollow cylinder. A first threaded hole 349 (as shown in FIG. 4) is formed in the inside of the first pole body 341. The second pole body 343 is a hollow cylinder with two openings set in two opposite ends of the hollow cylinder respectively. A second threaded hole 347 is formed in the inside of the second pole body 343. One end of the connection arm 345 is connected to the end of the first pole body 341, and another end of the connection arm 345 is connected to the external side plate of the second pole body 343.

The guide sleeve 360 includes a hollow cylindrical body 361 and two parallel flat portions 363 connected to the cylindrical body 361. A cutout 362 is defined in the side plate of the cylindrical body 361. The two flat portions 363 are extended from two sides of the cutout 362. The cylindrical body 361 and the two flat portions 363 are placed over the first pole body 341 and at least a portion of the connection arm 345, thereby providing a slideway for the first pole body 341 and the connection arm 345 to move up/down in the inside of the cylindrical body 361 and the two flat portions 363.

The adjusting wheel 380 is fixed to one end of the second threaded pole 370. In the embodiment, the adjusting wheel 380 and the second threaded pole 370 can be an injection molding machine. In another embodiment, the adjusting wheel 380 is fixed to the second threaded pole 370 by jointing. The adjusting wheel 380 is disk-shaped. One end of the second threaded pole 370 is screwed onto the second threaded hole 347, thereby driving the guide pole 340 to move up or down relative to the second threaded pole 370.

The guide sleeve 360 is fixed to the first side plate 212 of the lower shell 210. The adjusting wheel 380 and the second threaded pole 370 are set inside of the opening 218, and a portion of the adjusting wheel 380 is exposed by the opening 218. The second threaded pole 370 is movably hanged on the guide pole 340 by screwing. One end of the first threaded pole 320 away from the support base 310 is movably attached on the guide pole 340 with fasteners such as screws, and another end of the first threaded pole 320 fixed to the support base 310 is exposed through the perforation 216, thereby fixing the support base 310 under the first side plate 212.

Referring also to FIG. 4, in an initial state, the support mechanism 300 is located inside of the lower shell 210, the support base 310 is adhered to the bottom of the lower shell 210, the portion of the adjusting wheel 380 is exposed by the opening 218, the first threaded pole 320 is screwed into the first threaded hole 349, the second threaded hole 347 is located on the top of the second threaded pole 370, and the height of the main body 100 located on the support surface is equal to the thickness of the support base 310.

Figure 5:
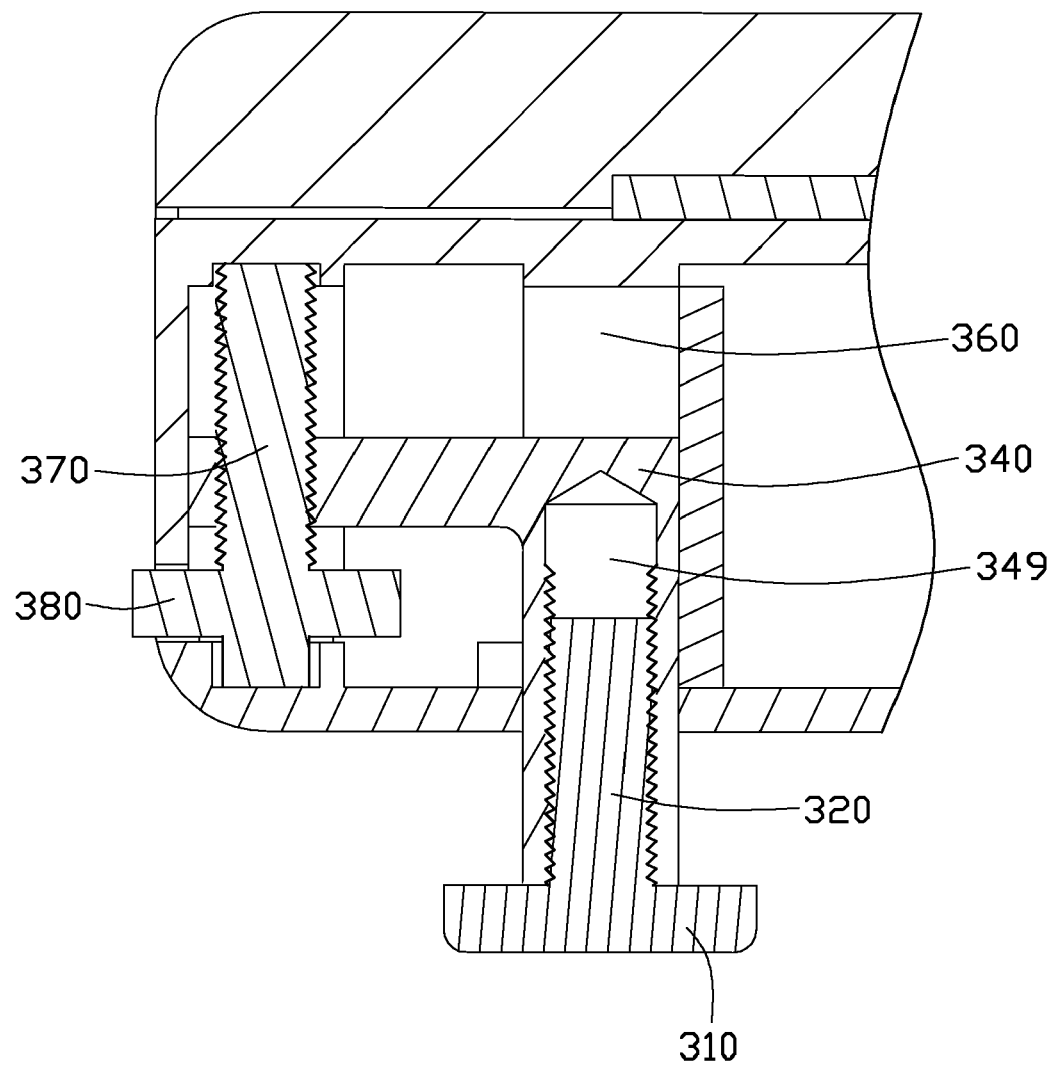
FIG. 5 is similar to FIG. 4, but showing the support mechanism in a first using state.

Referring also to FIG. 5, during a process of adjusting the first height of the main body 100 located on the support surface, the adjusting wheel 380 is rotated by the user; the second threaded pole 370 cooperates with the second threaded hole 347 to drive the guide pole 340 move down, thereby driving the first threaded pole 320 and the support base 310 to move. When the adjusting wheel 380 is rotated in one direction, the guide pole 340, the first threaded pole 320 and the support base 310 rotate out of the main body 100, and when the adjusting wheel 380 is rotated in an opposite direction, the guide pole 340, the first threaded pole 320 and the support base 310 rotate into the main body 100. When the height of the main body 100 located on the support surface is suitable, the adjusting wheel 380 is stopped to rotate, the second threaded pole 370 cooperates with the second threaded hole 347, thereby fixing the first pole body 341, the first threaded pole 320 and the support base 310 in position. That is, the height of the main body 100 located on the support surface is adjusted to another height.

Figure 6:
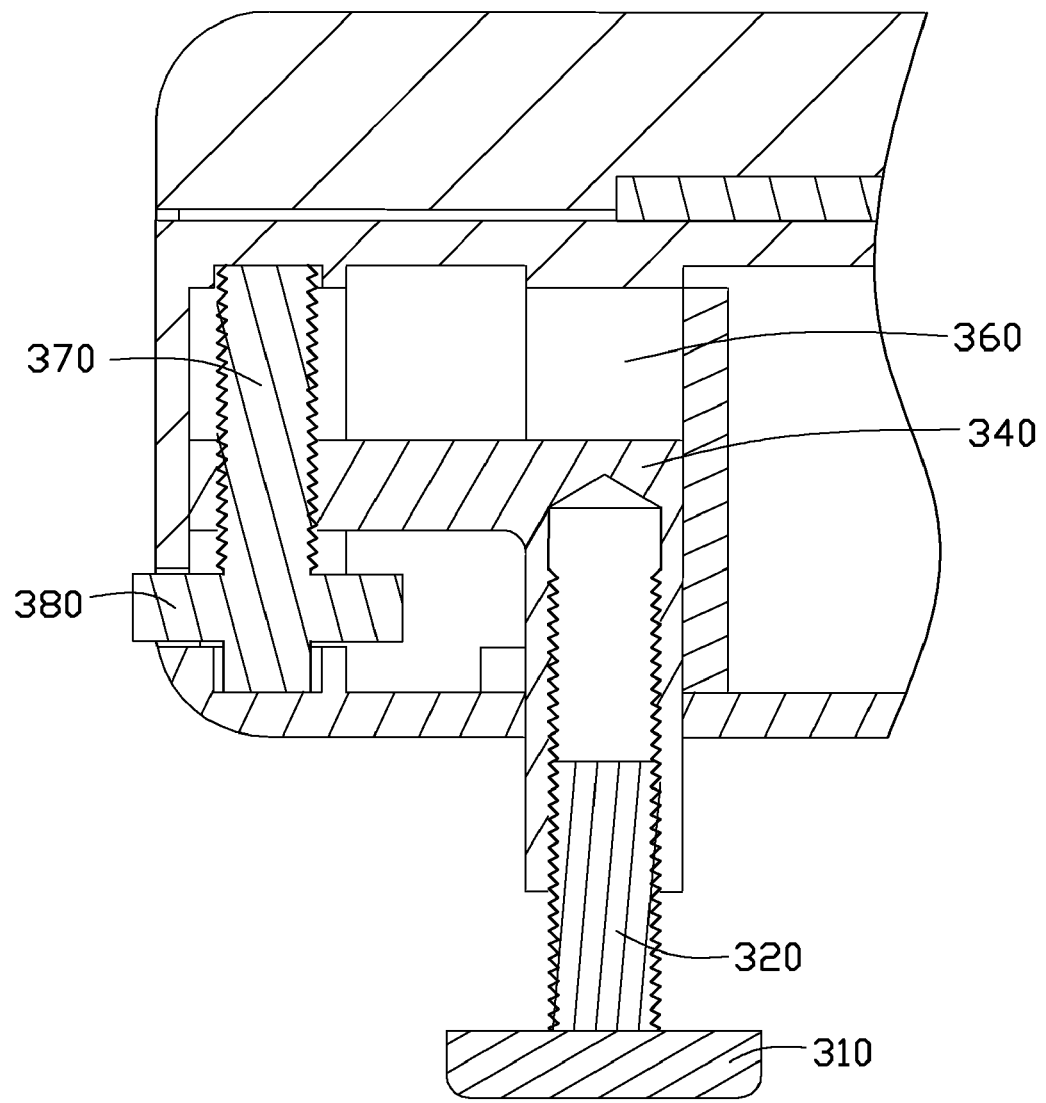
FIG. 6 is similar to FIG. 4, but showing the support mechanism in a second using state.

Referring also to FIG. 6, during a process of adjusting the second height of the main body 100 located on the support surface, and the second height of the main body 100 can not be adjusted by rotating the adjusting wheel 380. The support base 310 is rotated; the first threaded pole 320 cooperates with the first threaded hole 349 to drive the first threaded pole 320 to rotate out of the guide pole 340, thereby supporting the main body 100 on the support surface. When the support base 310 is rotated in one direction, the first threaded pole 320 and the support base 310 rotate out of the guide pole 340; when the support base 310 is rotated in an opposite direction, the first threaded pole 320 and the support base 310 rotate into of the guide pole 340. That is, the position of the first threaded pole 320 is adjusted in the inside of the first threaded hole 349 to increase the height of the main body 100 located on the support surface.

In another embodiment, the user can adjust the position of the first threaded pole 320 in the guide pole 340 and the position of the second threaded pole 370 in the second threaded hole 347 respectively, thereby adjusting the height of the main body 100 located on the support surface.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
    a main body comprising a housing; wherein the housing comprises a side plate and a bottom plate connected to the side plate,
    an opening is defined in the side plate, a perforation is defined in the bottom plate, and the opening is in alignment with the perforation; and
    a support mechanism, mounted on the inside of the housing, comprising
    a guide pole fixed to the bottom plate;
    a first threaded pole screwed onto the guide pole, and penetrating the perforation;
    a second threaded pole screwed onto the guide pole;
    an adjusting wheel fixed to the second threaded pole, and located on the opening of the side plate, wherein a portion of the adjusting wheel is exposed to the housing; and
    a support base fixed to the portion of the first threaded pole exposed from the housing;
    a guide sleeve fixed to the side plate, and placed over a portion of the guide pole to provide a slideway for the guide pole to move;
    wherein the guide pole comprises a first pole body, the first pole body is a hollow cylinder with an opening, and is connected to the first threaded pole;
    wherein the guide pole further comprises a second pole body which is parallel to the first pole body, the second pole body is a hollow cylinder with two openings, and is connected to the second threaded pole; and
    wherein, when the second threaded pole is rotated, the guide pole and the first threaded pole is driven to move.

2. The electronic device as described in claim 1, wherein a first threaded hole is formed inside of the first pole body, and is screwed onto the first threaded pole, thereby driving the first threaded pole movably inside of the first pole body.

3. The electronic device as described in claim 1, wherein a second threaded hole is formed inside of the second pole body, and is screwed onto the second threaded pole, thereby driving the second threaded pole movably inside of the second pole body.

4. The electronic device as described in claim 3, wherein the guide pole further comprises a connection arm, one end of the connection arm is connected to one end of the first pole body, and another end of the connection arm is connected to the external side plate of the second pole body.

5. The electronic device as described in claim 1, wherein the guide sleeve comprises a hollow cylindrical body and two parallel flat portions connected to the cylindrical body, a cutout is defined in the side plate of the cylindrical body, and the cylindrical body is configured for providing a slide way for the first pole body to move.

6. The electronic device as described in claim 5, wherein the two flat portions are extended from two sides of the cutout, and are configured for providing a slideway for the second pole body to move.

* * * * *